United States Patent [19]

Hook et al.

[11] 4,375,687
[45] Mar. 1, 1983

[54] HYPERSONIC WEDGE NOZZLE FOR CHEMICAL LASERS

[75] Inventors: Dale L. Hook; John Waypa, both of Rancho Palos Verdes, Calif.; Theodore A. Jacobs, Annandale, Va.

[73] Assignee: The United States of America as represented by the Secretary of the Army, Washington, D.C.

[21] Appl. No.: 220,474

[22] Filed: Dec. 29, 1980

[51] Int. Cl.³ .............................................. H01S 3/02
[52] U.S. Cl. ...................................... 372/58; 372/89; 372/701
[58] Field of Search ........................... 372/89, 58, 701; 239/552

[56] References Cited

U.S. PATENT DOCUMENTS 3,688,215  8/1972  Spencer ................................. 372/89
4,237,429 12/1980  Hook et al. ........................... 372/89

*Primary Examiner*—James W. Davie
*Attorney, Agent, or Firm*—Nathan Edelberg; Robert P. Gibson; James T. Deaton

[57] ABSTRACT

A hypersonic wedge nozzle for chemical lasers that has a radially diverging flow primary nozzle with a multiplicity of hypersonic wedge type secondary injection wedges at the exit end of the primary nozzle to allow gas flow to become supersonic in the primary nozzle before entering the regions between the secondary injection wedges or the surfaces thereof. Utilization of the large diverging primary nozzle in producing supersonic flow minimizes viscous effects in producing the supersonic flow in a chemical HF or DF laser.

2 Claims, 8 Drawing Figures

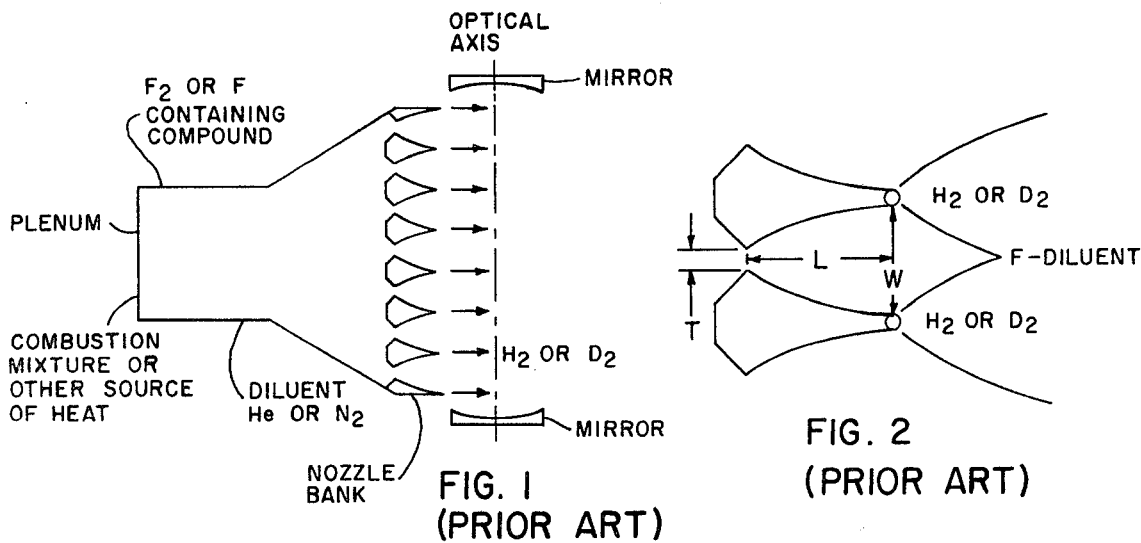
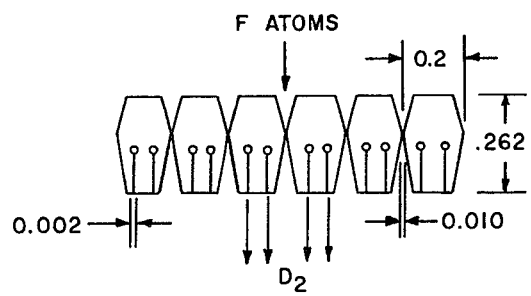
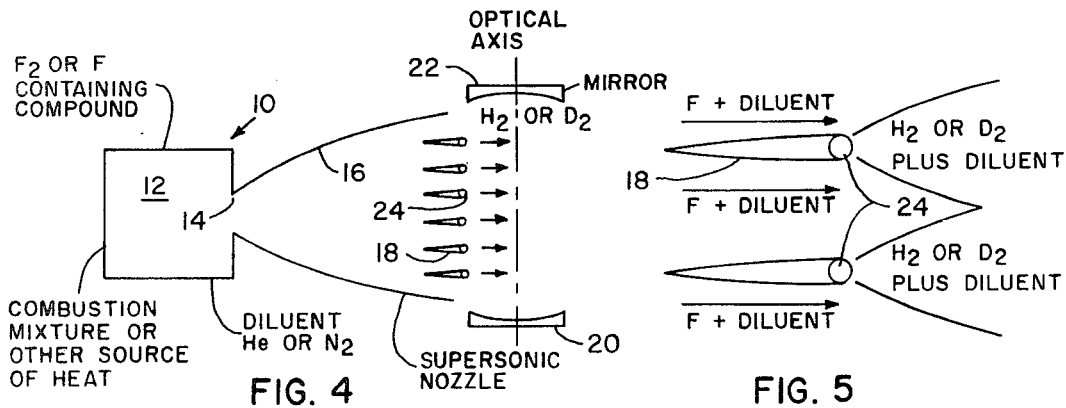

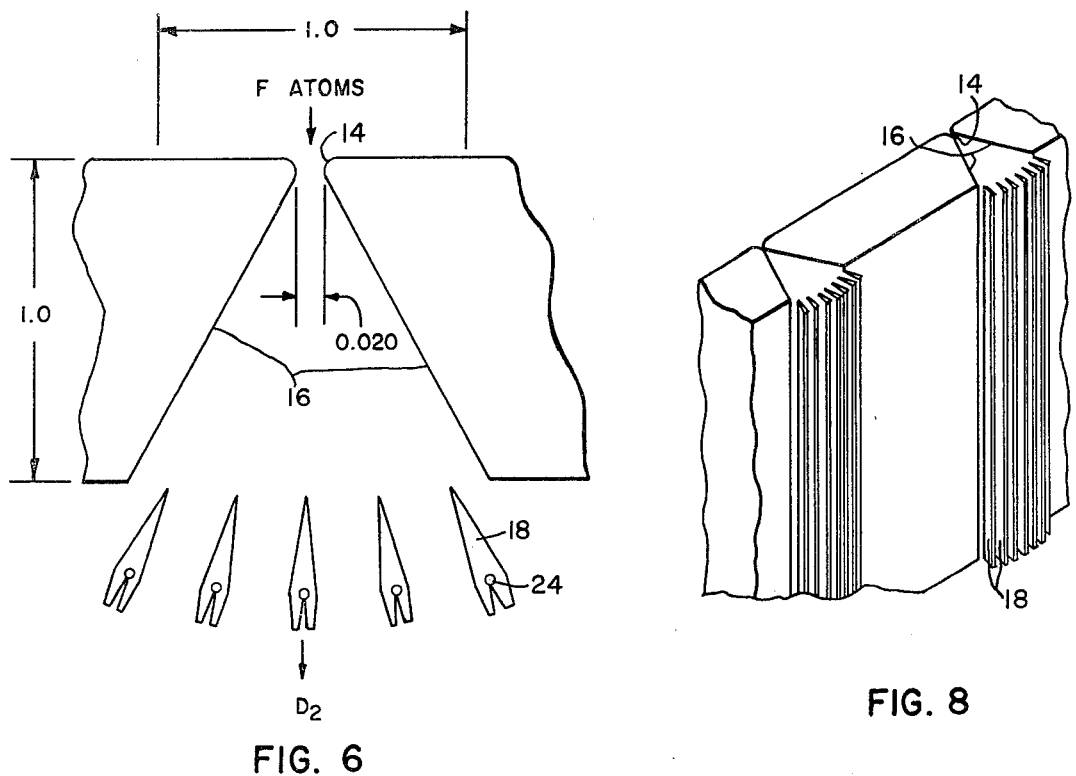
FIG. 6
FIG. 8
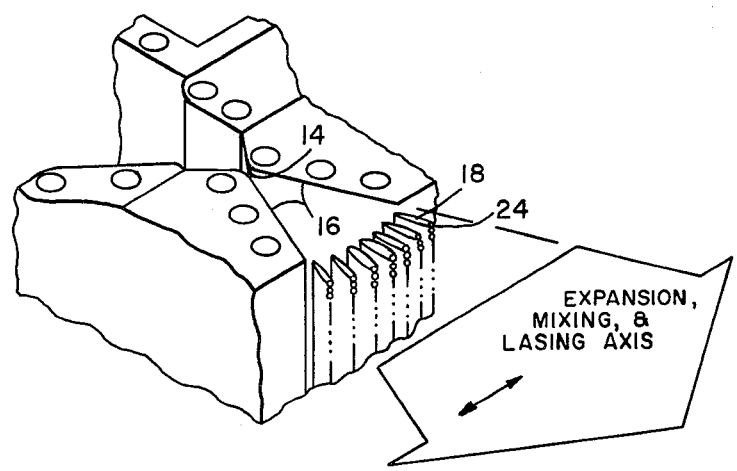
FIG. 7

HYPERSONIC WEDGE NOZZLE FOR CHEMICAL LASERS

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

Currently used chemical laser devices operate with a plenum chamber which is provided with gases which are heated by combustion or other means to produce atomic or free radical species and are structurally arranged as illustrated in prior art FIGS. 1, 2 and 3. For example, $F_2$ is heated to give F-atoms. Diluent gases such as He or $N_2$ are also added and heated in the plenum. Following the plenum, the gases are expanded through a supersonic nozzle to a high velocity and low pressure. The gases exit the nozzle to a cavity and form a free jet. $H_2$ or $D_2$ gases are injected into the cavity and mixed with the expanded F-containing free jet. The reaction with F-atoms initiates the chemical pumping mechanism which yields vibrationally excited HF or DF. Mirrors are placed in the cavity and lasing results from the vibrationally excited HF or DF. The gases are then pumped to a pressure such that atmospheric exhaust is possible. As illustrated in FIG. 2, aerodynamic considerations dictate the illustrated dimensions L, T, and W. It has been found both experimentally and theoretically that aerodynamic restrictions leading to the L, T, and W dimensions, together with the high plenum temperatures required for prior art lasing operation give rise to severe viscous effects in the supersonic nozzle defined by the dimensions L, T, and W. With He as a diluent and plenum temperatures in excess of 1000° K., it has been found that the flow exiting from the nozzles of working devices is totally viscous, i.e., the influence of the wall drag is distributed throughout the jet flow. The detrimental aspects of the viscous flow are a loss in total pressure, a decrease in the gas exit velocity and an increase in gas exit temperature, i.e., a decrease in Mach number. The attendant decrease in initial Mach number of the reacting streams dictates large quantities of diluent gases be included to prevent thermal choking of the flow in the presence of heat addition. Loss of total pressure and increased diluent ratios give rise to increased pumping requirements. Either a decrease in gas velocity or an increase in gas exit temperature lead to a reduction in the length of the gain supporting laser region with consequent degradation of laser beam coherence and increased mirror loading.

Therefore, it can be clearly seen that there is a need for better nozzle arrangements for introducing the free radical species with the secondary gases of $D_2$ or $H_2$.

Accordingly, it is an object of this invention to provide a chemical laser with a nozzle arrangement which operates supersonically at higher mass and laser efficiencies than that achievable in the more conventional prior art arrangements.

Another object of this invention is to provide a chemical laser nozzle arrangement that has efficiencies in excess of those achieved by conventional approaches in the art.

Still another object of this invention is to provide a supersonic nozzle with hypersonic wedges at the exit end of the diverging portions of the nozzle and with injection means for injecting secondary gases such as $D_2$ or $H_2$ into the jet stream of the primary gas or gases.

Other objects and advantages of this invention will be obvious to those skilled in this art.

SUMMARY OF THE INVENTION

In accordance with this invention, a hypersonic wedge nozzle for chemical lasers is provided in which a chamber is designed to receive a gas containing fluorine and the fluorine gas is caused to become supersonic in a two-dimensional source flow type expansion nozzle which causes the flow through the nozzle to expand and diverge radially outward from the nozzle throat and to contact a multiplicity of injection wedges that are located at the nozzle exit. $D_2$ or $H_2$ is injected from the injection wedges into the fluorine gas from said two-dimensional nozzle. Fluid mechanic expansion in the lasing zone is facilitated by separating the injection wedges and dispensing them in the outlet of the two-dimensional source nozzle.

BRIEF DESCRIPTION OF THE DRAWINGS

FIG. 1 is a schematic illustration of a chemical laser nozzle arrangement that is used in the prior art, FIG. 2 is an enlarged view of the nozzle structure of the prior art, FIG. 3 is a detailed illustration of the relative sizes of the nozzles of the prior art, FIG. 4 is a schematic illustration of a supersonic nozzle with wedge shaped secondary injectors in accordance with this invention, FIG. 5 is an enlarged view of the wedge shape secondary injectors illustrating the impinging flow of the gases used, FIG. 6 is a schematic view illustrating the relative sizes of a two-dimension nozzle with the wedge shape injection nozzles in accordance with this invention, FIG. 7 is a perspective view partially cut-away illustrating a two-dimensional hypersonic nozzle with the wedge shape secondary injections and illustrating the lasing axis, and FIG. 8 is a perspective view partially cut-away and illustrating that more than one of the two-dimensional hypersonic nozzles with the wedge shape secondary injectors can be used.

DESCRIPTION OF THE PREFERRED EMBODIMENT

Referring now to the drawing, a schematic illustration of this invention is illustrated in FIG. 4 and includes a housing structure 10 with a chamber 12 that is of a conventional design for receiving a compound containing $F_2$ or F-atoms as well as a diluent. These are heated in a conventional manner and caused to pass through a two-dimensional throat 14 to diverging nozzle section 16. At the exit end of nozzle section 16 a multiplicity of wedged shape injection tubes are positioned for injecting $H_2$ or $D_2$ with diluent if desired. When the F-atoms and the $H_2$ are $D_2$ atoms are mixed after passing wedge shaped injection tubes 18, these gases are mixed to cause lasing and an output to be produced at one of mirrors 20 and 22 in a conventional manner. FIG. 5 illustrates the relationship of introducing the $H_2$ or $D_2$ plus the diluent from wedges 18 to the F-atoms plus diluent by introducing these gases through passages 24 in injector tubes 18.

Applicant's invention of the chemical laser is built to obviate the problems enumerated above concerning the prior art. The distinction between the laser concept of the prior art and applicants' invention must be carefully noted. That is, the gas flow through nozzle 14 in applicants' invention is caused to become supersonic before it enters the region or surfaces of wedge-shaped injector tubes 18 which inject the $H_2$ or $D_2$. Because the supersonic flow is brought about in the large nozzle 16, viscous effects in producing the supersonic flow are minimized. When this supersonic flow from nozzle 16 traverses injector tubes 18, viscous effects are again minimized since the length of injector tubes 18 is no longer dictated by aerodynamic restriction. Calculations show the viscous effect for this new device to be only 10% of that of the currently operating prior art devices. The resulting flow downstream of wedge-shaped injector tubes 18 thus retains greater velocity and total pressure. Moreover the increase in static temperature brought about by viscous drag is restricted to a much smaller region of the flow field. Spacing and size of wedge-shaped injector tubes 18 are dictated largely by structural consideration; aerodynamic restrictions are minimized.

An important feature of this invention is that fluid mechanical interactions of the gas flows can be treated analytically by a large and published body of theory and experiment related to hypersonic flows. Each of the small wedge shaped injection tubes 18 can be viewed as a two-dimentional, sharp-wedged, re-entry shape vehicle. It is also pointed out that even though sharp-wedged injection tubes are shown, this invention does not exclude the use of a multiplicity of injection tubes in the outlet and in the hypersonic flow path of the gas and injection tubes that are from a sharp wedge shaped to a circular shape are considered as being useful when arranged in a multiplicity arrangement similar to the arrangement of the wedge shaped tubes. Even though other shapes may be used, applicants preferred shape for the injection nozzles is a sharp-wedge shape as illustrated. Extensive efforts over the past several years have gone into understanding, theoretically and experimentally, development of boundary layers over the wedges and cylinders, wakes produced by the wedges, gas mixing in the wakes of such wedges, injection of gases into the wake region of the wedges with and without subsequent chemical reactions, and turbulent flow onset of the wake region of the wedges. Thus, other design and scale-up considerations of applicants' invention can be conducted in a timely manner with deep insight into interactions involved in the chemically reacting flow fields. Knowledge of the detail fluid dynamic parameters also allows the problems of optical cavity design to be more readily addressed.

It is also pointed out that current nozzle arrays are costly to fabricate because of small nozzle dimensions, intricate cooling capacities, and the requirements of a single, integral assembly. As can be noted, applicants' invention requires tubes or wedge-shape cross-sections, which are simple to fabricate and can be fabricated individually. These components can be assembled in a large supersonic nozzle to form the secondary injection array. To illustrate this, reference FIGS. 7 and 8 which show a general body structure with two-dimensional nozzle 14 therein with wedge-shaped injection nozzles 18 positioned at the outlet to the nozzle. In each of these arrangements, the top surface is removed or top cover is removed to illustrate the arrangement of the injection nozzles to the main flow path. As can be seen, the main fluorine gas bearing stream flowing through nozzle 14 is caused to become supersonic in this two-dimensional source flow type expansion nozzle and as the flow passes through the throat of nozzle 14, the flow expands and diverges radially outward from the nozzle throat. Injection wedges 18 as can be seen are located at the nozzle exit and totally between the outer edges of the diverging nozzle portions 16. The injection wedges must be located at the outlet and between the diverging nozzle portions to function as needed. It is also pointed out that FIG. 8 illustrates how applicants' invention is integrated into a multiple element array. In this arrangement, each primary nozzle 14 contains and included divergence angle. Fluid mechanic expansion in the lasing zone is facilitated by separating the elements as shown. Downstream of the lasing region, the primary streams impinge and are turned downstream across the resulting oblique shock.

FIG. 6 schematically illustrates the various dimensions of the nozzle and wedge-shaped injection tubes relative to each other and these dimensions should be taken into consideration in fabricating a device in accordance with this invention.

By combining the advantages of the hypersonic wedge type secondary injection tubes 18 with the diverging radial flow primary nozzle 14, it is possible to create an HF or DF chemical laser which will operate supersonically at higher mass and molar efficiencies than that achievable in the more conventional approach such as that illustrated in FIGS. 1 thru 3 of the prior art. Efficiencies in excess of those achieved by conventional approaches have been projected by analysis and proven experimentally. In addition, this type of chemical laser provides for reduced thermal and fluid flow drag loading of the $D_2$ or $H_2$ injection elements, more economical construction, and decreased viscous flow effects resulting in (a) more controlled mixing of reactance, and (b) better recovery of total pressure.

We claim:

1. A hypersonic wedge nozzle for chemical lasers comprising a housing having a chamber therein and means for introducing a fluorine gas bearing stream into said chamber, a two-dimensional expansion nozzle leading from said chamber and having oppositely diverging walls, each of said walls having a width in the direction of flow through said two-dimensional expansion nozzle and a length which is perpendicular to said width, and a multiplicity of hypersonic secondary injection tubes mounted at the outlet defined by said walls and said tubes being positioned longitudinally of said walls, spaced from said walls and in the expanding area of said two-dimensional expansion nozzle, and said tubes having passages therein for injecting $H_2$ or $D_2$ for the chemical laser and being wedge-shaped from a front portion to a rear portion which contains said passages for injecting said $H_2$ or $D_2$, whereby an arrangement is provided for causing a resulting flow downstream of said tubes which retains greater velocity and total pressure when fluid flows through the arrangement and an arrangement in which the increase in static temperature brought about by viscous drag is restricted to a much smaller region of the flow field when fluid flows through said arrangement.

2. A hypersonic wedge nozzle for chemical lasers as set forth in claim 1, wherein said housing has a plurality of said two-dimensional nozzle and said hypersonic injection tube arrangements.

* * * * *